(12) United States Patent
Tu et al.

(10) Patent No.: US 8,239,733 B2
(45) Date of Patent: Aug. 7, 2012

(54) MEMORY DEVICE WITH PROTECTION CAPABILITY AND METHOD OF ACCESSING DATA THEREIN

(75) Inventors: Chih-Cheng Tu, Hsinchu (TW);
Yan-Wun Huang, Hsinchu (TW);
Han-Lung Huang, Hsinchu (TW);
Ming-Hung Chou, Hsinchu (TW);
Chien-Fu Huang, Hsinchu (TW);
Chih-Hwa Chang, Hsinchu (TW)

(73) Assignee: Skymedi Corporation, Hsinchu (TW)

( * ) Notice: Subject to any disclaimer, the term of this patent is extended or adjusted under 35 U.S.C. 154(b) by 438 days.

(21) Appl. No.: 12/626,800

(22) Filed: Nov. 27, 2009

(65) Prior Publication Data
US 2011/0131459 A1  Jun. 2, 2011

(51) Int. Cl.
*G06F 11/00* (2006.01)
(52) U.S. Cl. ............ 714/768; 714/52; 713/183; 713/193

(58) Field of Classification Search ........................ None
See application file for complete search history.

(56) References Cited

U.S. PATENT DOCUMENTS

| | | | |
|---|---|---|---|
| 5,073,899 A | 12/1991 | Collier et al. | |
| 5,541,993 A | 7/1996 | Fan et al. | |
| 7,467,407 B2 | 12/2008 | Yen | |
| 8,078,869 B2 * | 12/2011 | Adams et al. | 713/166 |
| 2002/0059549 A1 | 5/2002 | Gray | |
| 2008/0240230 A1 * | 10/2008 | Oxman et al. | 375/240.01 |
| 2009/0034722 A1 * | 2/2009 | Zaharris et al. | 380/44 |
| 2010/0293440 A1 * | 11/2010 | Thatcher et al. | 714/764 |
| 2012/0066505 A1 * | 3/2012 | Brown et al. | 713/183 |

* cited by examiner

*Primary Examiner* — Christopher McCarthy
(74) *Attorney, Agent, or Firm* — Huffman Law Group, P.C.

(57) ABSTRACT

The present invention is directed to a memory device with protection capability and a method of accessing data therein. A spreader encrypts input user data according to an entered password, and the encrypted data is then stored in a storage area. A despreader performs reverse process of the spreader on the stored data according to the entered password.

32 Claims, 4 Drawing Sheets

MEMORY DEVICE WITH PROTECTION CAPABILITY AND METHOD OF ACCESSING DATA THEREIN

BACKGROUND OF THE INVENTION

1. Field of the Invention

The present invention generally relates to a memory device, and more particularly to a memory device with protection capability.

2. Description of the Prior Art

Flash memory is a non-volatile storage device that is capable of being erased and reprogrammed. Moreover, the flash memory generally provides fast data access. Accordingly, the flash memory is widely used in a variety of electronic devices. Owing to technology advance, modern flash memory devices become denser and more compact. In addition to compactness of the flash memory, data security is also an important issue for the flash memory, particularly for a high-volume flash memory that contains huge amount of data.

Most conventional flash memory devices such as memory sticks have no schemes of protecting the stored data. Even a few modern flash memory devices provide data protection such as password verification, the stored data itself is not protected and therefore is still at risk of being stolen or destructed.

For the reason that conventional flash memory devices provide no protective strategies, a need has arisen to propose a novel scheme for protecting the stored data from being stolen or destructed in a secure manner.

SUMMARY OF THE INVENTION

In view of the foregoing, it is an object of the embodiment of the present invention to provide a memory device, such as a flash memory device, with effective protection capability and a method of securely accessing data in the memory device.

According to the embodiment of the memory device with protection capability, a spreader encrypts input user data according to an entered password. A storage area is used for storing encrypted data. A despreader performs reverse process of the spreader on the stored data according to the entered password.

According to the embodiment of the method of accessing data in a memory device with protection capability, user data is inputted to the memory device. A password is entered and a storage mode is selected. The user data is encrypted according to the selected storage mode, and the encrypted data is stored in a storage area. Subsequently, a request to retrieve the stored data is received. A password is secondly entered, and a corresponding storage mode is determined according to the secondly entered password. The stored data is decrypted by performing a reverse process of the encryption. The decrypted data is then retrieved from the memory device.

DETAILED DESCRIPTION OF THE INVENTION

Figure 1A:
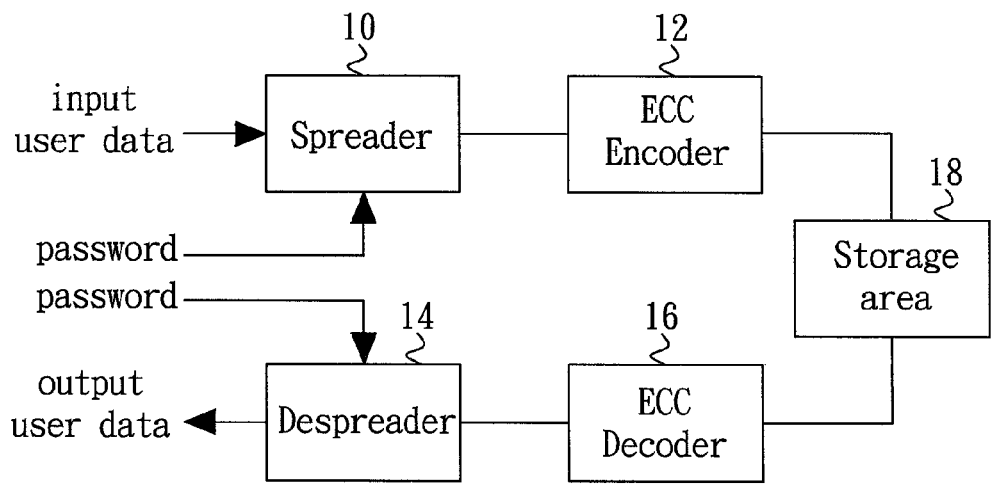
FIG. 1A shows a block diagram of a memory device with protection capability according to one embodiment of the present invention.
Figure 1B:
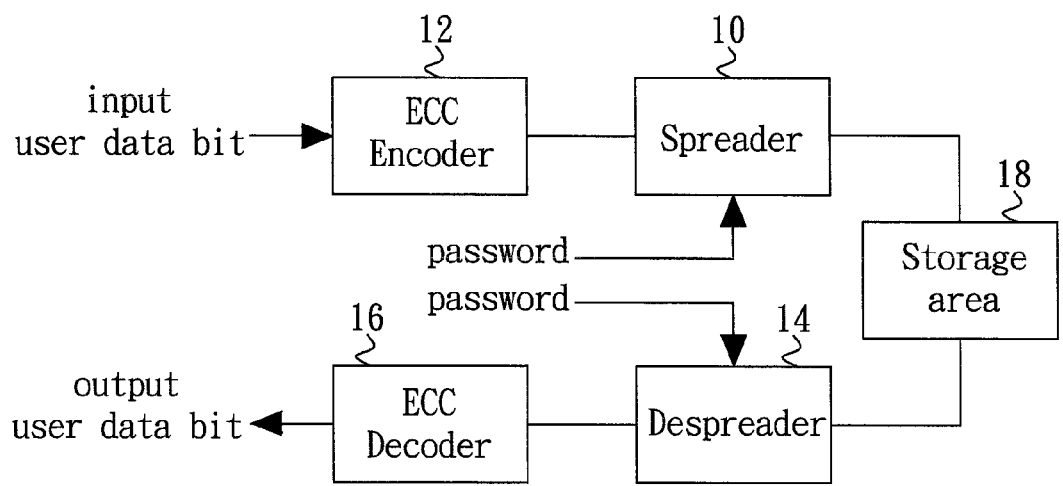
FIG. 1B shows a block diagram of a memory device with protection capability according to an alternative embodiment.

FIG. 1A shows a block diagram of a memory device with protection capability according to one embodiment of the present invention. FIG. 1B shows an alternative embodiment. Although flash memory is illustrated in either embodiment, it is appreciated that other types of memory device may be adapted as well.

In the embodiment, the memory device includes a spreader 10 and an error-correcting code (ECC) encoder 12 in a data input path, and includes a despreader 14 and an ECC decoder 16 in a data output path. Input user data are processed by the spreader 10 and the ECC encoder 12 before being stored in a storage area (e.g., flash memory) 18. In the embodiment, the spreader 10 is used to encrypt the input user data according to an entered password, and the ECC encoder 12 is used to detect and correct error(s) in the data. After the stored data of the storage area 18 are processed by the ECC decoder 16 and the despreader 14, the original user data may be recovered. In the embodiment, the despreader 14 is used to decrypt (i.e., a reverse process of the encryption in the spreader 10) the stored data of the storage area 18, and the ECC decoder 16 is used to perform reverse process of the ECC encoding in the ECC encoder 12. As shown in FIG. 1B, the order of the spreader 10 and the ECC encoder 12 is interchangeable. Similarly, the order of the ECC decoder 16 and the despreader 14 is also interchangeable.

Figure 2:
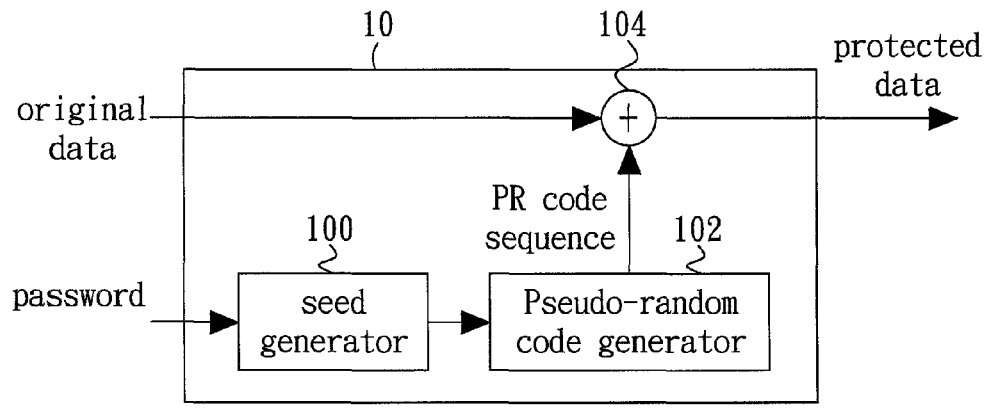
FIG. 2 shows a detailed block diagram of the spreader of FIG. 1A or FIG. 1B.

FIG. 2 shows a detailed block diagram of the spreader 10 of FIG. 1A or FIG. 1B. In the embodiment, the spreader 10 primarily includes a seed generator 100, a pseudo-random code generator 102 and a logic gate 104 such as an exclusive-OR (XOR) gate. Specifically, the seed generator 100 generates one or more seeds according to the entered password. The pseudo-random code generator 102 then generates pseudo-random (PR) code sequence according to the generated seed. A variety of exemplary embodiments of generating the seed(s) will be described later in this specification. The PR code sequence is then XOR-ed with original data (e.g., the input user data (FIG. 1A) or the ECC encoded data (FIG. 1B)) by the XOR gate 104, resulting in protected data to be stored in the storage area 18 (FIG. 1A or FIG. 1B).

Figure 3:
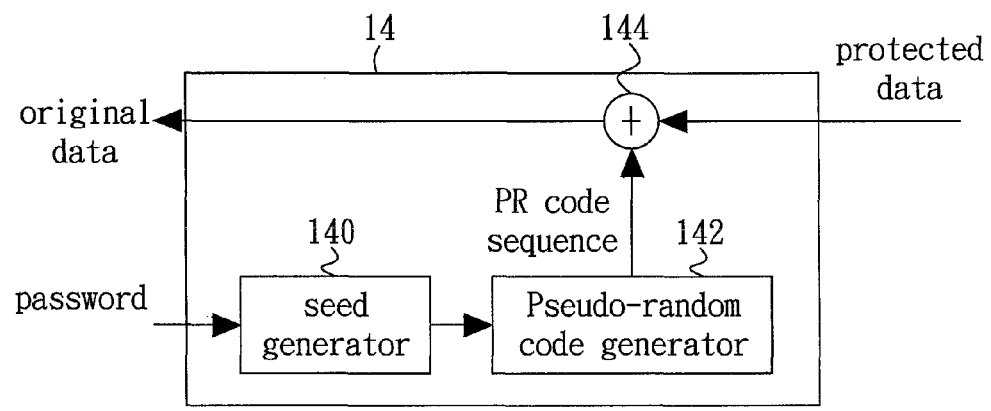
FIG. 3 shows a detailed block diagram of the despreader of FIG. 1A or FIG. 1B.

FIG. 3 shows a detailed block diagram of the despreader 14 of FIG. 1A or FIG. 1B. In the embodiment, the despreader 14 primarily includes a seed generator 140, a pseudo-random code generator 142 and a logic gate 144 such as an exclusive-OR (XOR) gate. Specifically, the seed generator 140 generates one or more seeds according to the entered password. The pseudo-random code generator 142 then generates pseudo-random (PR) code sequence according to the generated seed. The PR code sequence is then XOR-ed with protected data (e.g., the stored data (FIG. 1B) or the ECC decoded data (FIG. 1A)) by the XOR gate 144, resulting in original data that are the recovered user data (FIG. 1A) or the data to be ECC decoded (FIG. 1B).

Figure 4:
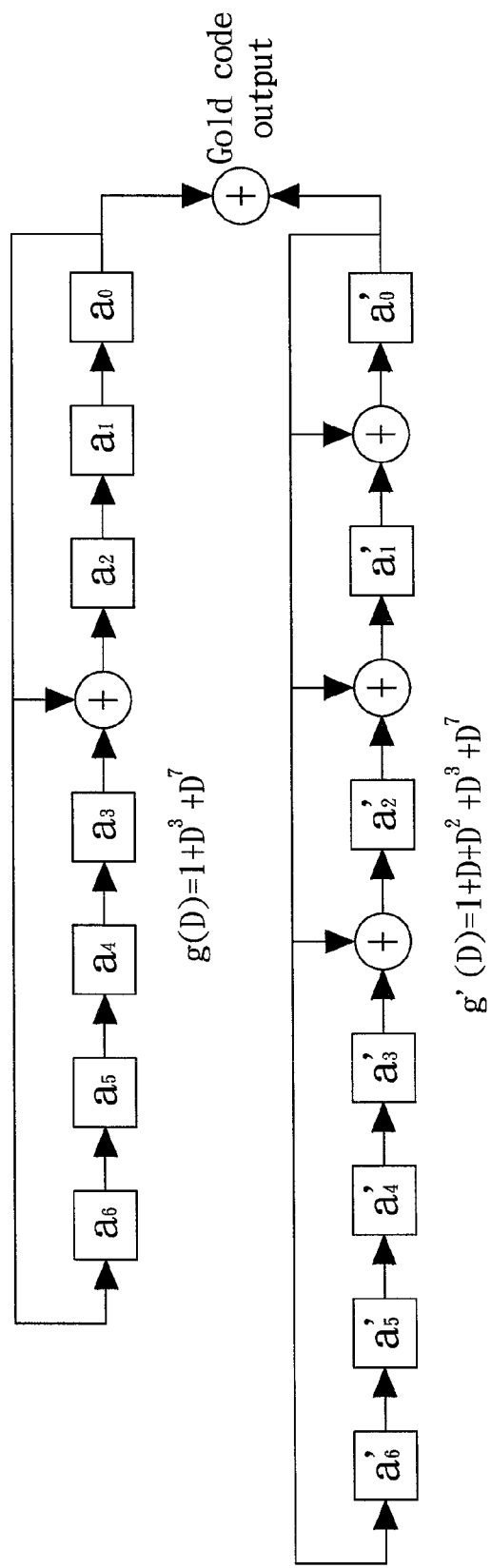
FIG. 4 shows an exemplary PR code generator of FIG. 2 or FIG. 3.

FIG. 4 shows an exemplary PR code generator 102 or 142 of FIG. 2 or FIG. 3. A gold code generator is exemplified in this embodiment. Specifically, sequences ($a_6a_5a_4a_3a_2a_1a_0$) and ($a'_6a'_5a'_4a'_3a'_2a'_1a'_0$) are the seeds generated by the seed generator 100 or 140 according to an entered password. In another embodiment, the seeds may be predetermined sequences. Generally speaking, the gold code generator is constructed based on the linear feedback shift register (LFSR) structure. As shown in the figure, results of two LFSR branches, e.g., g(D) and g'(D), are operated by a logic gate such as an XOR gate to generate a gold code output, i.e., the PR code sequence.

Figure 5:
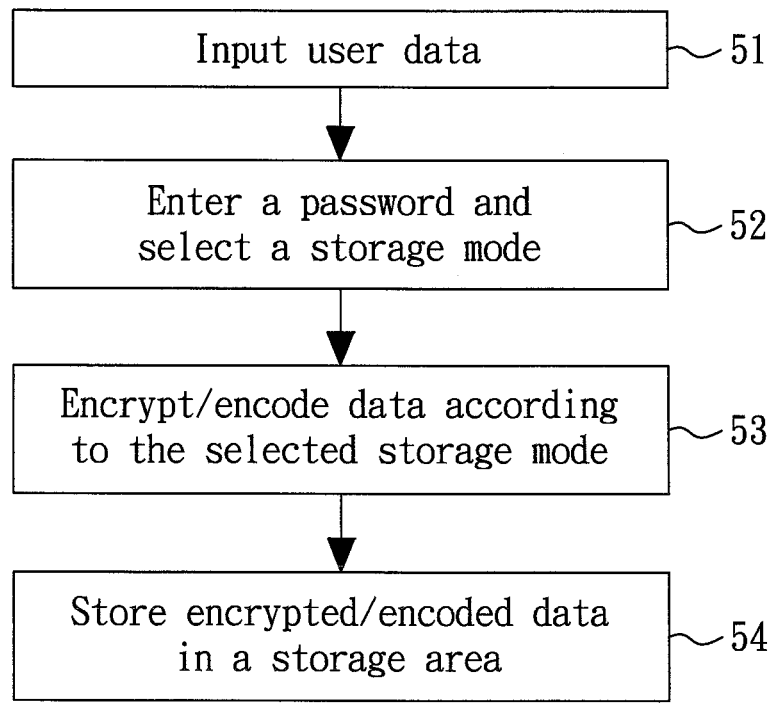
FIG. 5 shows a flow diagram that illustrates a method of storing data in a memory device with protection capability according to one embodiment of the present invention.

FIG. 5 shows a flow diagram that illustrates a method of storing data in a memory device with protection capability according to one embodiment of the present invention. In step 51, user data are inputted to the memory device. In step 52, a user is asked to enter a password and then select a storage mode. According to user requirement such as the importance of the data to be protected, the embodiment may provide different storage modes with different protection capability. For example, an advanced storage mode may use seed having length longer than that in a basic storage mode. Alternatively, the user may skip the password asking and directly proceed to store the user data, in a normal mode, without protection. Subsequently, in step 53, the user data are then encrypted and ECC encoded according to the selected storage mode, if the password is successfully verified. It is noted that, in some embodiment, the ECC encoding may still be performed even the normal mode is selected. Finally, in step 54, the encrypted/ECC encoded data are stored in a storage area such as the flash memory.

Figure 6:
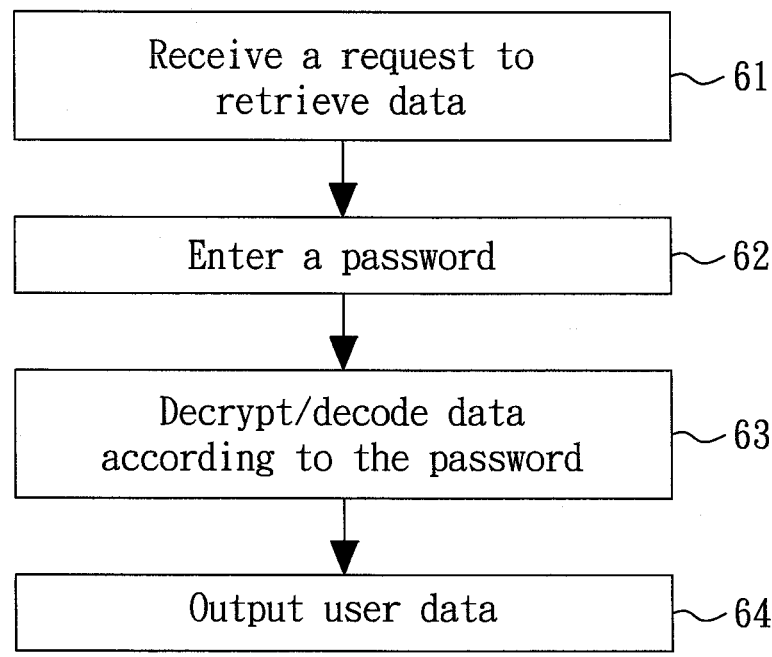
FIG. 6 shows a flow diagram that illustrates a method of retrieving data from a memory device with protection capability according to one embodiment of the present invention.

FIG. 6 shows a flow diagram that illustrates a method of retrieving data from a memory device with protection capability according to one embodiment of the present invention. In step 61, the memory device receives a request (from a user) to retrieve data. In step 62, the user is asked to enter a password. A corresponding storage mode is determined according to the entered password. Alternatively, the user may skip the password asking and directly proceed to retrieve unprotected data in a normal mode. Subsequently, in step 63, the stored data are then decrypted and ECC decoded according to the selected storage mode, if the password is successfully verified. It is noted that, in some embodiment, the ECC decoding may still be performed even the normal mode is selected. Finally, in step 64, the decrypted/ECC decoded data are retrieved from the memory device.

Some exemplary methods of generating the seeds are demonstrated in the following exemplary embodiments.

Exemplary Embodiment I with respect to a basic storage mode, the entered password is transformed from a decimal form to a binary form. For example, a password 7849 is transformed to (13-bit) "1111010101001". In order to obtain 14-bit seed sequence required by the PR code generator (e.g., gold code generator) shown in FIG. 4, the 13-bit password is duplicated to result in 26-bit sequence, i.e., "1111010101001 1111010101001". The first 14 bits of the 26-bit sequence is then used as the seed for the PR code generator.

With respect to an advanced storage mode, a seed with twofold length (i.e., 28-bit seed) is required for increasing the protection capability. Accordingly, the 13-bit password is duplicated twice to result in 39-bit sequence, i.e., "1111010101001 1111010101001 1111010101001". The first 28 bits of the 39-bit sequence is then used as the seed for the PR code generator.

Exemplary Embodiment II

With respect to a basic storage mode, the entered password is transformed from a decimal form to a binary form, and is then processed by Hash algorithm such as SHA-1, SHA-256 or SHA-512. For example, a password 6382179 is transformed to (24-bit) "01100001 01100010 01100011". The (24-bit) binary sequence is processed by SHA-512 to result in 512-bit message digest, which may be expressed in hexadecimal form as ddaf35a193617aba cc417349ae204131 12e6fa4e89a97ea2 0a9eeee64b55d39a 2192992a274fc1a8 36ba3c23a3feebbd 454d4423643ce80e 2a9ac94fa54ca49f". The first 14 bits of the 512-bit sequence is then used as the seed for the PR code generator.

With respect to an advanced storage mode, a seed with twofold length (i.e., 28-bit seed) is required for increasing the protection capability. Accordingly, the first 28 bits of the 512-bit sequence is then used as the seed for the PR code generator.

Exemplary Embodiment III

The 512-bit sequence regenerated by SHA-512 in the previous exemplary embodiment is duplicated to result in 1024-bit sequence of "0" and "1". Each bit of the 1024-bit is associated with a data block. In this exemplary embodiment, the data block associated with the bit "1" is encrypted/en-coded, while the data block associated with the bit "0" is left un-encrypted and en-encoded.

Although specific embodiments have been illustrated and described, it will be appreciated by those skilled in the art that various modifications may be made without departing from the scope of the present invention, which is intended to be limited solely by the appended claims.

What is claimed is:

1. A memory device with protection capability, comprising:
    a spreader for encrypting input user data according to an entered password;
    a storage area for storing encrypted data; and
    a despreader for performing reverse process of the spreader on the stored data according to the entered password;
    wherein the spreader comprises:
    a seed generator for generating at least one seed according to the entered password;
    a pseudo-random (PR) code generator for generating a PR code sequence according to the seed; and
    a logic gate for operating on original data inputting to the spreader and the PR code sequence, therefore resulting in protected data to be stored in the storage area;
    wherein the seed is generated by taking a portion of binary bits of the entered password, and the binary bits of the entered password are further duplicated.

2. The memory device of claim 1, further comprising:
    an error-correcting code (ECC) encoder for detecting and correcting error of the input user data or the encrypted data.

3. The memory device of claim 2, further comprising:
    an error-correcting code (ECC) decoder for performing reverse process of the ECC encoder on the stored data.

4. The memory device of claim 1, wherein the storage area comprises flash memory.

5. The memory device of claim 1, wherein the logic gate comprises an exclusive-OR gate.

6. The memory device of claim 1, wherein the PR code generator comprises a gold code generator.

7. The memory device of claim 1, wherein the despreader comprises:
    a seed generator for generating at least one seed according to the entered password;
    a pseudo-random (PR) code generator for generating a PR code sequence according to the seed; and a logic gate for operating on protected data inputting to the despreader and the PR code sequence, therefore resulting in recovered data to be retrieved from the memory device.

8. The memory device of claim 7, wherein the logic gate comprises an exclusive-OR gate.

9. The memory device of claim 7, wherein the PR code generator comprises a gold code generator.

10. A method of accessing data in a memory device with protection capability, comprising:
inputting user data to the memory device;
after a password is entered and a storage mode is selected, encrypting the user data according to the selected storage mode; and
storing the encrypted data in a storage area;
wherein the encryption step comprises:
generating at least one seed according to the entered password;
generating a pseudo-random (PR) code sequence according to the seed; and
logically operating on input original data and the PR code sequence, therefore resulting in protected data to be stored in the storage area;
wherein the seed is generated by taking a portion of binary bits of the entered password, and the binary bits of the entered password are further duplicated.

11. The method of claim 10, further comprising a step of: error-correcting the input user data or the encrypted data.

12. The method of claim 11, further comprising a step of: performing reverse process of the error-correcting on the stored data.

13. The method of claim 10, wherein the storage area comprises flash memory.

14. The method of claim 10, further comprising steps of:
receiving a request to retrieve the stored data;
after a password is secondly entered, determining a corresponding storage mode according to the secondly entered password;
decrypting the stored data by performing a reverse process of the encryption; and
retrieving the decrypted data from the memory device.

15. The method of claim 14, wherein the decryption step comprises:
generating at least one seed according to the secondly entered password;
generating a PR code sequence according to the seed; and
logically operating on input protected data and the PR code sequence, therefore resulting in recovered data to be retrieved from the memory device.

16. A memory device with protection capability, comprising:
a spreader for encrypting input user data according to an entered password;
a storage area for storing encrypted data; and
a despreader for performing reverse process of the spreader on the stored data according to the entered password;
wherein the spreader comprises:
a seed generator for generating at least one seed according to the entered password;
a pseudo-random (PR) code generator for generating a PR code sequence according to the seed; and
a logic gate for operating on original data inputting to the spreader and the PR code sequence, therefore resulting in protected data to be stored in the storage area;
wherein the seed is generated by subjecting binary bits of the entered password to Hash operation, followed by taking a portion of binary bits of the Hash-operated password; and the binary bits of the Hash-operated password are further duplicated.

17. The memory device of claim 16, further comprising:
an error-correcting code (ECC) encoder for detecting and correcting error of the input user data or the encrypted data.

18. The memory device of claim 17, further comprising:
an error-correcting code (ECC) decoder for performing reverse process of the ECC encoder on the stored data.

19. The memory device of claim 16, wherein the storage area comprises flash memory.

20. The memory device of claim 16, wherein the logic gate comprises an exclusive-OR gate.

21. The memory device of claim 16, wherein the PR code generator comprises a gold code generator.

22. The memory device of claim 16, wherein each binary bit of the duplicated Hash-operated password is associated with a data block, and the encryption and decryption of the data block is performed according to the binary bit "0" or "1".

23. The memory device of claim 16, wherein the despreader comprises:
a seed generator for generating at least one seed according to the entered password;
a pseudo-random (PR) code generator for generating a PR code sequence according to the seed; and
a logic gate for operating on protected data inputting to the despreader and the PR code sequence, therefore resulting in recovered data to be retrieved from the memory device.

24. The memory device of claim 23, wherein the logic gate comprises an exclusive-OR gate.

25. The memory device of claim 23, wherein the PR code generator comprises a gold code generator.

26. A method of accessing data in a memory device with protection capability, comprising:
inputting user data to the memory device;
after a password is entered and a storage mode is selected, encrypting the user data according to the selected storage mode; and
storing the encrypted data in a storage area;
wherein the encryption step comprises:
generating at least one seed according to the entered password;
generating a pseudo-random (PR) code sequence according to the seed; and
logically operating on input original data and the PR code sequence, therefore resulting in protected data to be stored in the storage area;
wherein the seed is generated by subjecting binary bits of the entered password to Hash operation, followed by taking a portion of binary bits of the Hash-operated password; and the binary bits of the Hash-operated password are further duplicated.

27. The method of claim 26, wherein each binary bit of the duplicated Hash-operated password is associated with a data block, and the encryption and decryption of the data block is performed according to the binary bit "0" or "1".

28. The method of claim 26, further comprising a step of: error-correcting the input user data or the encrypted data.

29. The method of claim 28, further comprising a step of: performing reverse process of the error-correcting on the stored data.

30. The method of claim 26, wherein the storage area comprises flash memory.

31. The method of claim 26, further comprising steps of:

receiving a request to retrieve the stored data;

after a password is secondly entered, determining a corresponding storage mode according to the secondly entered password;

decrypting the stored data by performing a reverse process of the encryption; and retrieving the decrypted data from the memory device.

32. The method of claim 31, wherein the decryption step comprises:

generating at least one seed according to the secondly entered password;

generating a PR code sequence according to the seed; and logically operating on input protected data and the PR code sequence, therefore resulting in recovered data to be retrieved from the memory device.

* * * * *